United States Patent [19]

Davis

[11] 4,083,084
[45] Apr. 11, 1978

[54] MACHINE FOR SEPARATING MEAT FROM CRAB SHELLS

[75] Inventor: Walter L. Davis, Milton-Freewater, Oreg.

[73] Assignee: Applied Magnetics, Inc., Goleta, Calif.

[21] Appl. No.: 739,981

[22] Filed: Nov. 8, 1976

[51] Int. Cl.$^2$ .............................................. A22C 29/00
[52] U.S. Cl. ............................................ 17/73; 17/48
[58] Field of Search ......................... 17/71, 73, 74, 48

[56] References Cited

U.S. PATENT DOCUMENTS

| | | | |
|---|---|---|---|
| 2,502,901 | 3/1950 | Harris et al. | 17/71 |
| 2,660,754 | 12/1953 | Roshko | 17/73 |
| 2,663,897 | 12/1953 | Greiner et al. | 17/71 |
| 3,020,583 | 2/1962 | LaPeyre et al. | 17/71 |
| 3,084,379 | 4/1963 | Henning | 17/73 |
| 3,203,039 | 8/1965 | Glidden et al. | 17/71 |
| 3,230,578 | 1/1966 | Marvin et al. | 17/48 |
| 3,310,832 | 3/1967 | Ambos et al. | 17/48 |
| 3,359,595 | 12/1967 | Anderson et al. | 17/71 |
| 4,004,321 | 1/1977 | Harrison | 17/71 |

Primary Examiner—Russell R. Kinsey
Assistant Examiner—Paul J. Hirsch
Attorney, Agent, or Firm—Wells, St. John & Roberts

[57] ABSTRACT

A crab meat removing machine is described to facilitate separation of crab meat from its exoskeleton or shell. The machine includes a number of specifically located rollers at a discharge end of an elongated belt type conveyor. Crab bodies and crab legs are placed on the belt conveyor which operates to move the bodies and legs in a prescribed direction toward the rollers. A first roller is situated above the discharge for the elongated conveyor while a second roller tangentially engages the first roller and is located downstream of the conveyor discharge. A space is thus provided between the second roller and conveyor discharge through which meat may fall. The crab parts moving on the conveyor are first engaged between the conveyor and first roller. These two members act as a gripping mechanism by which the crab parts are firmly held while being directed on downstream to engagement with the peripheral surface of the second roll. The second roll is rotated in a direction complementary to the direction of the parts moving on conveyor and will thus guide the parts into engagement between the two moving rollers. As the rollers draw the crab parts through, they simultaneously squeeze the shells and force the meat contained therein outwardly through the leg articulation openings, or in the case of bodies, through the opening created by previous sagittal sectioning. A water jet is directed against the roller surface to enhance disengagement of the meat from the rollers once it has been successfully squeezed from the shell. The parts are in an inclined condition with the exit orifices for the meat being oriented downwardly. This facilitates a considerably high rate of recovery of undamaged meat products.

7 Claims, 4 Drawing Figures

MACHINE FOR SEPARATING MEAT FROM CRAB SHELLS

BACKGROUND OF THE INVENTION

The present invention is related to the field of crab meat recovery apparatus and more particularly to such apparatus that utilizes rolls for squeezing the meat successively from the exoskeleton through the use of rollers.

The marketing price differential is very substantial between whole or chunk type crab meat and "riced" crab meat (shredded). For example, a recent quoted figure is two dollars per pound for chunk or whole pieces of crab meat while riced meat is marketable at approximately one dollar per pound. The difference in obtaining the forms of meat, whether it be whole or riced, is often determined by the machinery utilized to separate the crab meat from its surrounding shell. Often, a roller type machine is utilized wherein the crab meat is successively squeezed outwardly of the shell. This has proved to be somewhat effective but a certain percentage of the meat is expected to be carried on through between the rolls. This meat is essentially destroyed for the purposes of marketing as whole or chunk type crab meat. It can therefore be understood that it is very desirable to obtain a separating machine that will operate as efficiently as possible to separate whole pieces of meat from the crab shells without damaging the meat to such an extent that it must be shredded and sold as riced meat.

United States Pat. No. 3,325,856 to H. J. Pack et al granted June 20, 1967 discloses a crab handling apparatus that completes the whole operation of butchering and removing the meat from crab bodies. The mechanisms utilized in this device to separate the meat from the bodies is comprised of paired conical rolls. The rolls are held in tangential contact. In fact, they are pressed together to form ridges at the point of contact. Crabs parts are delivered to the rolls, which are continuously rotating, such that the shells engage between the rolls and are carried through and squeezed sufficiently hard to force the meat outwardly and onto the ridges. The removed meat is supposed to ride along the ridges while the shells are carried through the rolls. The axes for the rolls are inclined relative to one another such that the line of contact between the two rolls is inclined. Thus, the meat works it way along the line of contact and drops from one end of the rolls while the shells fall from the point of engagement between rolls. Thus the meat is claimed to be effectively separated from the crab backs. A water jet is provided to help wash the meat toward the meat discharge end of the contacting cones. Both the cone shaped rollers are coated with neoprene of one and one quarter inches thickness. The neoprene is preferably of forty durometer hardness to facilitate pulling of the shells between the rolls in formation of the longitudinal or axial ridges when the conical rolls are pressed together. The rolls, since they are held in a substantially horizontal orientation, must operate to press the shells such that the meat is forced in an upward direction. There is therefore a tendency for the meat to be drawn downward between the rolls regardless of the longitudinal "ridges". Further, there is little assurance that the parts will be oriented properly with the exit orifices for the meat located in the proper orientation with respect to the rolls. If oriented otherwise, the shell and meat will be drawn through the rolls without the meat being extracted therefrom.

Other known forms of machines utilized to separate crab meat from their exoskeleton utilize horizontally oriented rolls. In this form, somewhat similar to the "ringer" of old style washing machines, an operator feeds the crab parts between two horizontal closely adjacent rotating rolls. An example of this form is shown by U.S. Pat. No. 2,660,754 granted to F. O. Roshko on Dec. 1, 1953. The operator is in a somewhat precarious position since he must manually feed the parts between the squeezing rolls. Thus, the safety capabilities of such systems are minimal. However, the crab parts are oriented in a substantial horizontal position during the squeezing process so a slightly more effective separation of the meat from the shells is realized over the forms by which the meat must be pressed upwardly from between rolls. Even so, a depressingly high precentage of the meat is dragged through the horizontal rolls and must therefore be shredded and sold as riced meat.

U.S. Pat. No. 2,574,044 to Lapeyre, granted Nov. 6, 1951 discloses a shrimp peeling machine that makes use of a multiplicity of rollers for removing the exoskeleton of the shrimp. The shrimp are delivered to and move axially along the rollers while the rollers oscillate about their axes. The shrimp are thus "pinched" between adjacent rolls, then shifted to another set to be "pinched" again until the shell has been completely removed. Jets of water are used to clean the shell and slime from the rollers.

U.S. Pat. No. 2,838,786 to J. M. Ward, issued June 17, 1958, discloses an apparatus for extracting crab meat. Actually, this apparatus is designed to make hand "picking" or separating crab meat from shells more efficient. Thus an operator uses a hand held fluid pressure gun to "blow" the crab meat from its surrounding shell. Various provisions are made for manually and automatically handling the crab carcasses.

It is therefore a primary object of the present invention to provide a machine for separating crab meat from its associated exoskeleton in a more efficient manner than has been previously recognized with conventional machines.

An additional object is to provide such a machine that is considerably safer since an elongated conveyor belt surface is utilized to receive the crab legs and bodies, to direct them between the meat separating rolls. Thus, there is little chance of an operator getting his fingers or hand crushed between the rollers.

A further object is to provide such a machine that is adjustable to enable its operation on different sizes of crab.

A still further object is to provide such a machine that will operate at a relatively high rate of speed as compared to hand operations.

These and still further objects and advantages will become apparent upon reading the following detailed description which, taken with the accompanying drawings, disclose a preferred form of the invention. It should be noted however that the description and drawings are given only by way of example to illustrate a preferred form of the invention and are not intended to place restrictions thereon. The scope of the invention is set forth only by the claims found at the end of the specification.

BRIEF DESCRIPTION OF THE DRAWINGS

A preferred form of the present invention is illustrated in the accompanying drawings in which.

DETAILED DESCRIPTION OF A PREFERRED EMBODIMENT

Figure 4:
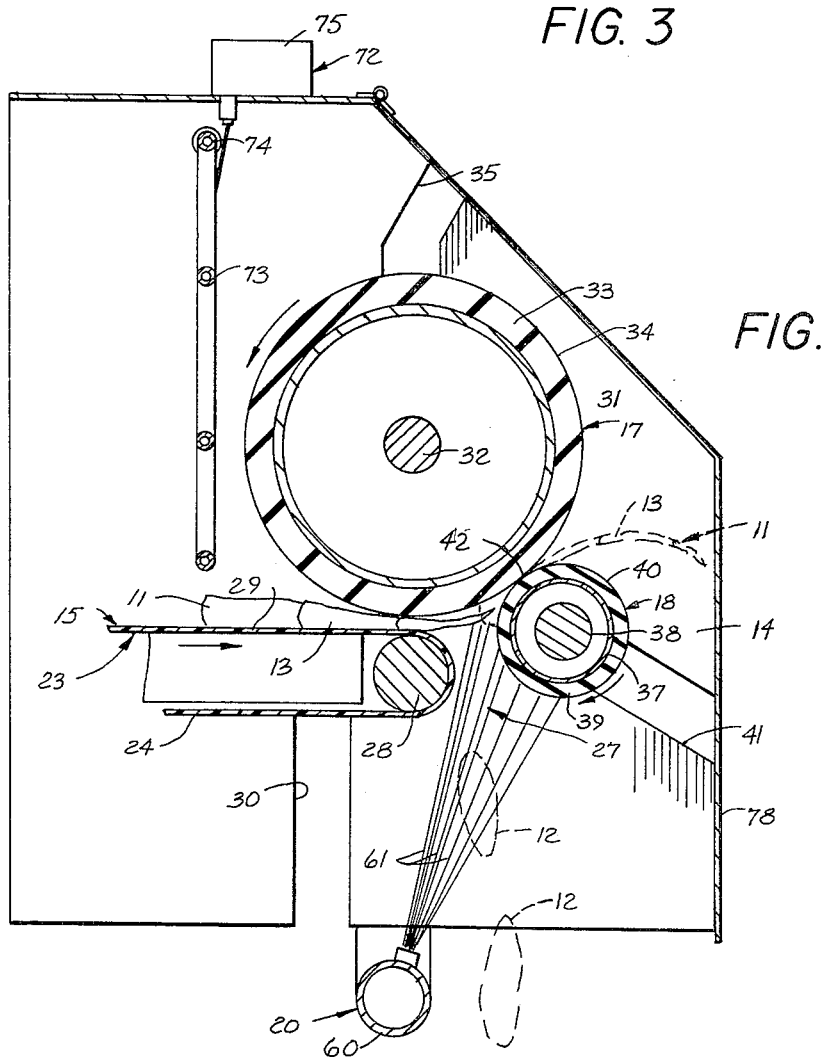
FIG. 4 is a sectional view taken substantially along line 4—4 in FIG. 1 on a somewhat larger scale than that used in FIG. 3.

A crab meat removing machine of a preferred form is generally illustrated in the accompanying drawings and is designated therein by the reference character 10. It is intended that the machine be utilized for removing the meat from crab legs and sectioned crab bodies and separating the shell or exoskeleton from the removed meat. FIG. 4 illustrates a crab leg at 11 in two positions on the present machine. Also illustrated is the meat 12 (in dashed lines) after removal from the shell which is shown at 13.

The machine basically includes an upright support framework 14. Located on the framework 14 is a feed means 15 which functions to deliver crab parts to a first roller means 17 and a second roller means 18 for the purpose of successively squeezing the meat outwardly of its associated shell. The roller means 17 and 18 are driven, along with the feed means 15, by a drive means generally illustrated at 19. A spray means 20 is also provided to assist in the removal of the separated meat from the peripheral surfaces of the roller means.

The feed means 15 as shown is basically comprised of an elongated conveyor 23. It is made up of an elongated endless conveyor belt 24 extending from an infeed station 25 to a discharge station 27 (FIG. 4). The infeed station is defined by an infeed conveyor roll 26. The discharge station 27 is defined by a freely rotatable discharge roll 28. Rolls 26 and 28 hold the belt 24 in a substantially horizontal orientation with a working flight 29 thereof extending along a substantially horizontal plane. The discharge roll 28 is adjustably mounted to the frame 14 within adjusting slots 30. Slots 30 facilitate horizontal adjustment of the roll 28 in relation to the first and second roller means 17 and 18.

The first roller means 17 is illustrated in substantial detail in FIG. 4 of the drawings. It is basically comprised of a cylindrical drum 31 mounted to a shaft 32 that, in turn, is rotatably carried by framework 14. The rotational axis for the drum 31 and shaft 32 is transverse to the longitudinal dimension of conveyor 23 and is parallel to the axis of rotation for the discharge roll 28. Drum 31 is provided with a coating 33 of resilient material. This material is finsished to a smooth condition to define a relatively smooth cylindrical, peripheral surface 34 thereon.

First roller means 17 is also adjustably held relative to the framework within upright mounting slots 35. This adjustment feature is provided to enable selective positioning of the first roller means in relation to the conveyor discharge roll 28 and second roller means 18.

The second roller means 18 is comprised of a drum 37 mounted to a shaft 28. The axis of the drum 37 and shaft 38 is held by the framework in parallel relationship to the axes of the first roller means 17 and conveyor roll 28. Drum 37 also includes a coating surface 39 that is formed of a resilient material. The material is machined to a relatively smooth surface to define a cylindrical peripheral surface 40.

Like roller means 17 and discharge roll 28, the second roller means 18 is adjustably mounted to the frame through the provision of mounting slots 41. Thus, second roller means 18 may be independently adjusted relative to the first roller means 17 and discharge roll 28. However, it is preferable that the second roller means be in tangential contact with the first roller means 17. Further, it is preferred that this point of tangential contact as shown at 42 be located above the planar surface of the working conveyor flight 29. This particular relationship assures that the crab parts will be in a downwardly inclined position during the squeezing process and that the meat may fall freely from the shell.

It may be noted that the diameter of roller means 17 is substantially larger than that of roller means 18 and discharge roll 28. By this arrangement there can be an appropriate space (preferably at least 1 inch) between conveyor discharge roll and second roller means 18 while both stay in a close, if not touching, relationship with the first roller means 17. This arrangement also facilitates the positioning of the tangential point of contact 42 above the plane of the working flight 29.

As briefly stated above, the coatings 33 and 39 are formed of a resilient material. More specifically, the resilient material is comprised of a food grade rubber of 50 ± 5 durometer hardness. This particular hardness has been discovered to be most effective in pressing the crab meat outwardly from the shell without also dragging the meat between the rolls or excessively damaging the meat during the squeezing process while providing sufficient frictional properties to firmly grip the crab parts.

Figure 1:
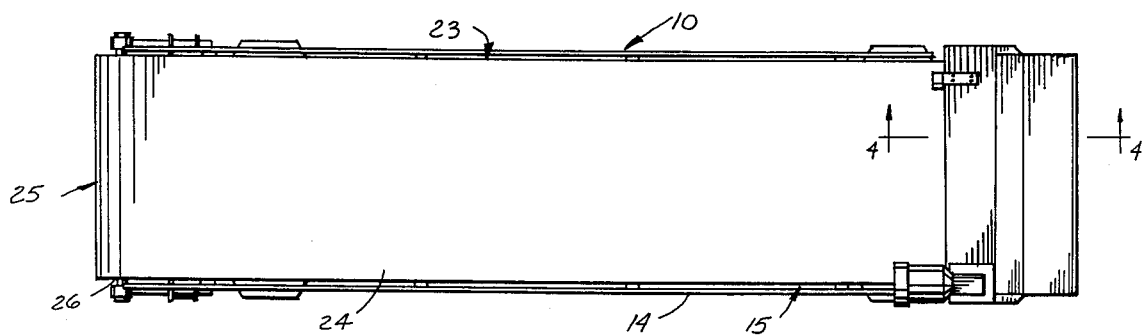
FIG. 1 is a plan view of the present machine.
Figure 2:
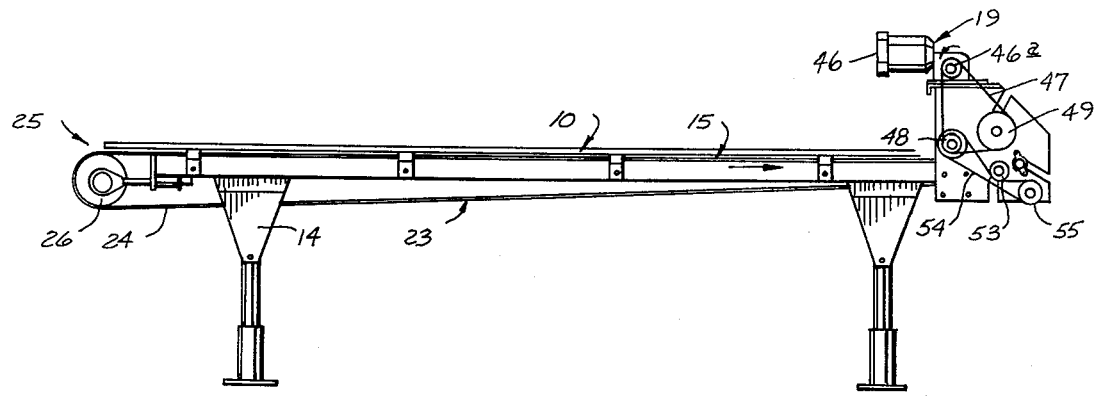
FIG. 2 is a side elevational view of the machine.
Figure 3:
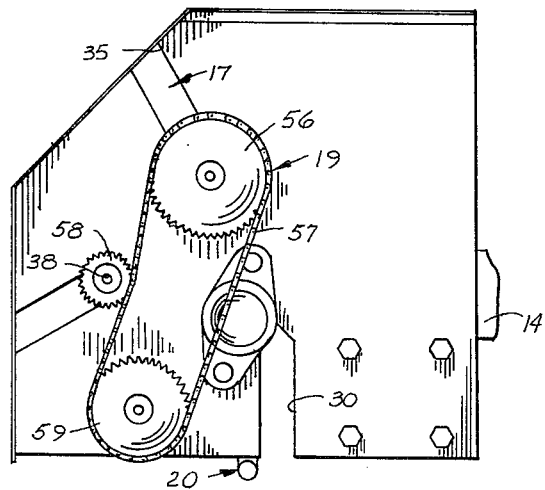
FIG. 3 is an enlarged, fragmentary view of a portion of the drive mechanism for the machine.

The drive means 19 is shown in some detail by FIGS. 2 and 3. The drive means 19 is simply comprised of a motor and chain arrangement through which the roller means 17 and 18 and feed means 15 are simultaneously operated. An appropriate drive motor 46 (FIG. 2) is mounted to the framework 14. Motor 46 includes a drive sprocket 46a that is operatively connected to an endless chain 47. Chain 47 is also interconnected with an intermediate sprocket 48 and a sprocket 49 that is affixed for rotation with the first roller means 17. The intermediate sprocket 48 is a double sprocket and also receives a second chain 54. This endless chain 54 extends about the second part of the idler or intermediate sprocket 48 and to a sprocket 53 that is affixed to the discharge roll 28. Chain 54 is also interconnected with an idler sprocket 55 that is freely rotatably mounted to framework 14.

Drive for the second roller means 18 is accomplished on the opposite side of the machine as that shown in FIG. 2. This side is shown in detail in FIG. 3. The first roller means 17 has a second sprocket 56 mounted thereon with a chain 57 extending therefrom to operate a sprocket 58 affixed to the shaft 38 of second roller means 18. An idler and tension adjusting sprocket 59 is also provided that is freely rotatably carried by framework 14 to train the chain against sprocket 59. Sprockets 56 and 58 are proportionate in their pitch diameters to the corresponding cross sectional diameters of roller means 17 and 18. Thus the roller means will rotate at the same peripheral speed, preferably in the vicinity of 40 feet per minute.

By tracing movement of the drive means through the various sprockets, it may be seen that rotation of the motor drive sprocket 46a in the direction indicated by the arrow in FIG. 2 will effect rotational movement of roller means 17 and 18 in a direction corresponding to the movement of conveyor belt 24 along the working flight 29 thereof. Thus, as viewed in FIG. 4, the first roller means 17 will rotate in a counter-clockwise motion while the second roller means 18 rotates clockwise. The clockwise motion of the discharge roll 28 causes movement of the conveyor working flight along its horizontal plane in a prescribed direction toward the roll means 17 and 18.

Spray means 20 is illustrated in substantial detail by FIG. 4. Basically, spray means 20 is comprised of a transverse spray bar 60 that is mounted to the framework 14 below the discharge station. The spray bar 60 is perforated and the perforations are directed toward the peripheral surface of second roller means 18. The perforations direct jets of water such as that diagrammatically illustrated at 61 against the peripheral surface 40 of roller means 18. This water spray is under substantial pressure (between 45 and 75 psi) in order to effectively dislodge the separated chunks of crab meat from the peripheral surfaces of the rollers. The dislodged meat may then fall freely between the conveyor discharge roll 28 and second roller means 18 into a bin or other receiving container below (not shown).

A control means is generally illustrated at 72 for effectively shutting down operation of the machine upon sensing an oversized object within the vicinity of the roller means 17 and 18. Control means 72 is comprised of a gate 73 mounted to framework 14 at pivots 74. The gate 73 will swing freely about the axis of pivots 74. A limit switch 75 is also mounted to the framework 14 above the gate 73. It includes a feeler arm 76 that extends downwardly toward engagement with the gate 73. The arm 76 actuates limit switch 75 upon engagement by the inwardly swinging gate 73. This inward swinging motion is caused by an oversized object of the conveyor trying to gain entry between the roller means 17 and 18. The limit switch 75 is connected to motor 46 through an appropriate electrical circuit and will open the circuit upon actuation of the switch by the inwardly swinging gate 73. Thus, there is little if any chance that an operator could accidently or even intentionally place his hand in the hazardous area adjacent the roller means 17, 18 without shutting the machine down.

Other precautions are provided in the form of a hinged cover 78 that may be selectively opened to gain access to the roller means 17 and 18 for adjustment purposes. The cover 78 does provide a safety precaution but is intended primarily to contain the water spray directed through the spray bar 60.

Operation of the present invention may be easily understood with reference to FIG. 4 of the drawings. During operation, an operator places a crab part, such as the leg illustrated at 11, on the working flight of the conveyor 23. He situates the leg such that the distal end or pointed tip of the leg is pointing toward the roller means 17 and 18. This is the only operation required to be accomplished by hand. Therefore, the machine may be effectively operated by one worker. However, the surface of conveyor 23 may be extended such that several workers may be placing crab parts simultaneously on the conveyor from either side at longitudinally spaced locations thereon.

Operation of motor 46 causes the feed means 15 to move the crab parts toward engagement with roller means 17 and 18. A leg is shown in FIG. 4 in engagement with the roller means 17 and the feed means 15 prior to its engagement between the roller means 17 and 18. This area is utilized as a gripping area to assure positive contact with the crab part in order that it may be directed firmly toward engagement with the peripheral surface 40 of second roller means 18.

The positioning of second roller means 18 is such that the peripheral surface 40 is in the direct path of the distal end of the leg presently held between roller means 17 and feed means 15. Thus, the distal end will engage the peripheral surface 40 and, because of the direction of rotation of that surface, will be moved upwardly to become engaged between the rotating peripheral surfaces 34 and 40. This is accomplished before the crab part leaves engagement with the feed means 15 and first roller means 17. Thus, a positive feeding motion is provided through the present arrangement.

As the crab part progresses in the upward direction through the rotating peripheral surfaces 34 and 40, the coatings 33 and 39 disfigure slightly to conform somewhat to the configuration of the crab part. However, the hardness of the material is such that the shell is squeezed an amount sufficient to push the meat held within the shell outwardly through the downwardly inclined opening.

It should be noted also that since the point of tangential contact between the roller means 17 and 18 is located above the planar surface of the working flight 29, that the otherwise horizontal position of the crab part is changed to a downwardly inclined position. This positioning facilitates gravitational movement of the meat outward of the shell and encourages the meat to drop freely from the peripheral roller surfaces.

To assure that the meat does drop from engagement with the rollers, the spray bar 60 operates continuously to direct jets of water against the peripheral surfaces to wash the meat from engagement with the roller surfaces. The disengaged meat will drop gravitationally downward between the peripheral surface of the second roller means and the discharge roll 28 of feed means 15 to a container waiting below. The empty shell will continue moving through the engaged roller means 17 and 18 to be discharged on the downstream side of second roller means 18. It may also be received in an appropriate container (not shown).

It has been found that the present machine is substantially more efficient in removal of whole meat from crab parts than existing forms of machinery. Studies have shown that conventional machines may recover an average of 14.77 percent of live crab weight in whole chunk meat. The present machine has proved in operation to recover a total of approximately 24.5 to 26 percent of the total live crab weight in whole chunk pieces. Present indications are that a substantial savings may be obtained utilizing this machine over prior machines. This substantial increase in efficiency of meat recovery is attributable to the specific arrangement of the roller means 17 and 18 in relation to the conveyor feed means 15.

It may have become evident upon reading the above description that various changes and modifications may be made therein. It is therefore intended that only the following claims be taken as definitions of the invention.

What is claimed is:

1. A crab meat removing machine for separating crab meat from its exoskeleton or shell, comprising:
   a supporting framework;

feed means on the framework for receiving and moving the crab parts in a prescribed horizontal path from an infeed station and discharging the crab parts from a discharge roller at a discharge station;

a small diameter squeeze roller means rotatably mounted on the framework in the horizontal path and spaced downstream of the feed means discharge roller forming a gap therebetween and having a peripheral surface extending vertically above the horizontal path;

a large diameter squeeze roller means rotatably mounted on the framework above the horizontal path and spanning over the gap between the feed means discharge roller and the small diameter squeeze roller means;

wherein the large diameter squeeze roller means has a peripheral surface engaging the peripheral surface of the small diameter squeeze roller means in an inclined tangential relationship forming an inclined squeeze nip elevated above the horizontal path for squeezing the crab parts therebetween;

wherein the peripheral surface of the large diameter squeeze roller means extends over the feed means discharge roller in horizontal tangential relationship with the horizontal path forming a horizontal gripping nip between the large diameter squeeze roller means and the discharge roller for gripping the crab parts therebetween;

wherein the peripheral surfaces of the large and small squeeze roller means are formed of rubber-like resilient material for functionally engaging, and squeezing the crab exoskeleton therebetween with sufficient force to separate the crab meat from the crab exoskeleton;

drive means for operatively driving the feed means and the small and large squeeze roller means for conveying the crab parts from the infeed station to the discharge station with the large diameter squeeze roller means and the discharge roller gripping the crab parts therebetween and projecting forward ends of gripped crab parts through the gap and against the small diameter squeeze roller means with the small diameter squeeze means deflecting the forward ends of the crab parts upward and into the inclined squeeze nip while rear ends of the crab parts are being gripped in the gripping nip and applying a positive forward pressure on the crab parts with the small and large squeeze roller means squeezing the crab exoskeleton in the inclined squeeze nip to extrude the crab meat from the exoskeleton and enable the crab meat to fall by gravity through the gap as the rear ends clear the gripping nip.

2. The crab meat removing machine as defined by claim 1 wherein the feed means is comprised of an elongated endless conveyor having a horizontal working flight leading from the infeed station to the discharge station.

3. The crab meat removing machine as defined by claim 1 wherein the peripheral surfaces of the small and large squeeze roller means is constructed of resilient material of food grade rubber of 50 ± 5 durometer hardness.

4. The crab meat removing machine as defined by claim 1 further comprising water spray means for directing a jet of water up through the gap and against the small and large squeeze roller means to wash crab meat from the roller means.

5. The crab meat removing machine as defined by claim 1 wherein the gap between the discharge roller of the feed means and the small squeeze roller means is at least one inch.

6. The crab meat removing machine is defined by claim 1 wherein the feed means is an elongated endless conveyor having a working flight leading from the infeed to the discharge station and wherein a control means is situated between the infeed station and the discharge station to prevent passage of worker's hands between the feed means and roller means.

7. The crab meat removing machine as defined by claim 6 wherein the control means includes a pivoted gate on the framework upstream of the roller means adjacent the feed means and switch means responsive to movement of the gate for deactivating the drive means upon engagement of oversize articles moving on the feed means by the gate.

* * * * *